Oct. 26, 1954  L. H. SCURLOCK  2,692,515

DIFFERENTIAL GEAR SET

Filed March 29, 1952

INVENTOR:
Lewis H. Scurlock,
BY
E. J. Booth
ATTORNEY

Patented Oct. 26, 1954

2,692,515

UNITED STATES PATENT OFFICE 2,692,515

DIFFERENTIAL GEAR SET

Lewis H. Scurlock, Chicago, Ill.

Application March 29, 1952, Serial No. 279,364

8 Claims. (Cl. 74—711)

This invention relates to differential gear sets and more particularly to an automatic power dividing bevel gear differential for use in automotive vehicles to drive the driving wheels thereof.

In my United States Letters Patent No. 2,067,952, there is disclosed and claimed a differential gear set in which the side gears are formed with hills and dales and the pinion is eccentrically mounted. Thus, as the side gears turn relative to each other the torque ratio between the pinion and side gears changes so that if only one wheel has good traction the vehicle will still be driven. Under severe conditions the wheels may rotate relative to each other to a considerable extent but the wheel having traction will receive a series of torque impulses due to the hill and dale formation of the side gears which are sufficient to drive the vehicle.

Experience with gear sets of this type has shown that the principle is entirely sound and operative. However, when the gears are formed with conventional involute teeth as shown in the patent, it has been found that they wear rapidly and that a certain amount of binding occurs due to interference between the teeth. It is the principal object of the present invention to provide a differential gear set of the type shown in my patent, in which the gears run smoothly with each other at all times so that wear and binding are minimized.

Another object is to provide a gear set in which the teeth of the meshing gear elements are unevenly spaced relative to each other to compensate for changes in the effective radius of the pinion in different positions. In the preferred construction the pinion teeth are evenly spaced and the side gear teeth are unevenly spaced with the widest tooth spacing at the bottom of the dales with the tooth spacing gradually decreasing to a minimum at the tops of the hills.

Still another object is to provide a differential gear set in which the side gear teeth between the bottoms of the dales and the tops of the hills have their sides of a different depth, with the deepest sides facing the dales.

Still another object is to provide a differential gear set in which the pinion teeth are of substantially involute shape but with the tips of the teeth rounded or skewed.

A further object is to provide a differential gear set in which the numbers of teeth on the different gear elements are so related that the side gear teeth are symmetrically distributed and each pinion tooth always meshes with the same side gear tooth. For this purpose the pinion has an even number of teeth and each side gear has a number of teeth equal to the product of the number of pinion teeth and the numbers of hills or dales on the side gear.

A still further object is to provide a differential gear set in which the pinions are mounted and guided for proper action in a minimum of space and with no interference with the side gears.

The above and other objects and advantages of the invention will be more readily apparent when viewed in connection with the accompanying drawings in which.

Figure 1:
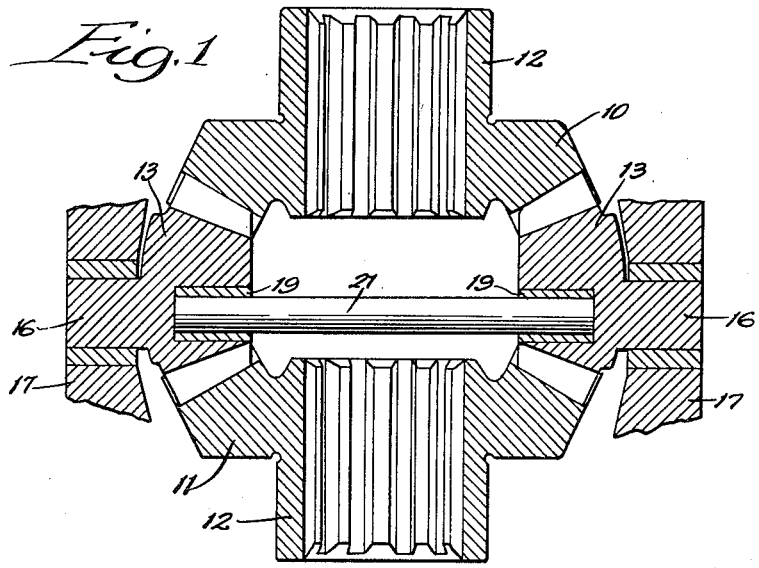
Figure 1 is a section through a differential gear set embodying the invention.

The differential as shown in Figure 1 comprises a pair of identical side gears 10 and 11 of the pivotal gear type having hubs 12 by which they may be mounted on relatively rotatable shafts such as the driving axles of a vehicle. The gears 10 and 11 are mounted coaxially with their toothed faces facing and spaced from each other to receive between them pinions 13. While two pinions have been shown, it will be apparent that any desired number of pinions could be employed depending upon the design and the load to be carried.

Figure 2:
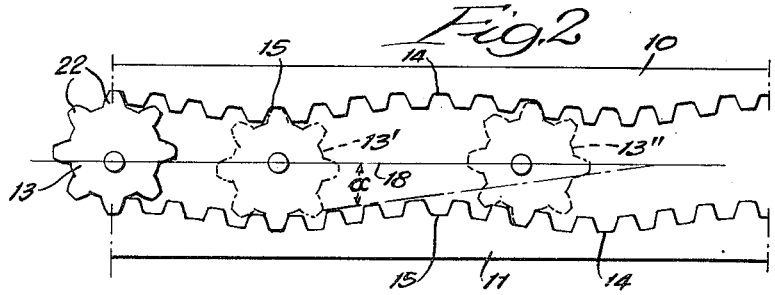
Figure 2 is a developed view showing the pinion meshing with the side gear teeth in different positions.

As best seen in Figure 2, the toothed faces of the side gears 10 and 11 are sinuously formed to provide low spots or dales 14 and high spots or hills 15. To mesh properly with the side gears as they rotate relative to each other, the pinions 13 are formed with hubs 16 which extend outward therefrom and which are journalled in a gear casing 17 which may carry a driving ring gear as in the conventional differential. The hubs 16 are eccentric with respect to the centers of the pinions 13 and when a plurality of pinions are employed the axes of the hubs all lie in a common plane indicated at 18 in Figure 2.

To guide the pinions and prevent them from tilting each of the pinions is formed on its inner narrow face with a socket 19 and the opposite ends of a guide shaft 21 are journalled in the sockets in bearings as shown. Preferably the sockets 19 and the guide shaft 21 are coaxial with the hubs 16 and in the case of a two pinion differential as illustrated, the guide shaft extends diametrically between the pinions to support them and to hold them against tilting.

The pinions 13 are preferably formed with uniformly spaced substantially standard involute teeth 22, as best seen in Figure 2. To facilitate proper meshing of the pinions with the uneven, specially shaped side gear teeth as described hereinafter the tips of the pinion teeth outward from the pitch line are preferably rounded off or skewed to eliminate interference of the tooth tips with the side gear teeth.

Figure 3:
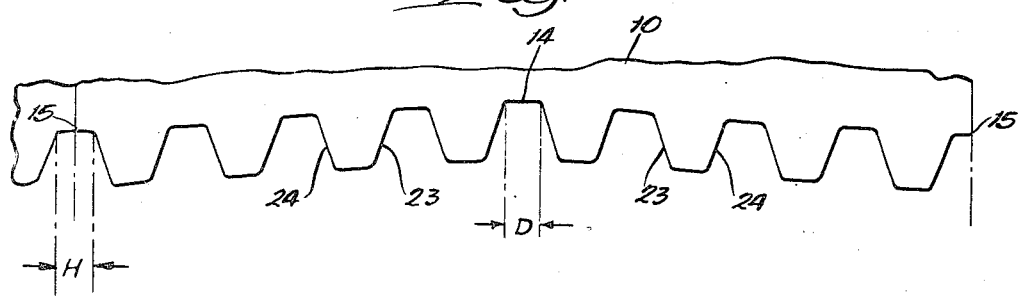
Figure 3 is an enlarged partial profile view of the side gear teeth.

The side gears as shown in Figures 2 and 3 are formed with rack type teeth which are specially shaped to mesh properly with the pinion teeth in various relative positions of the elements. The side gear teeth as best shown in Figure 3 are so spaced that a space between teeth lies at the bottoms of the dales and also at the tops of the hills. Between the bottoms of the dales and tops of the hills the side gear teeth have their tips at a slight angle and the bottoms of the spaces between them at a similar angle α corresponding to the sinuous form of the side gear faces. Thus, each side gear tooth has one long side 23 facing the dale and a short side 24 facing the hill.

Furthermore, because the effective turning radius of the pinion changes as it rolls on the side gear the tooth spacing is made uneven. Thus, the space between the teeth at the top of a hill is smaller than any of the other spaces H between teeth and is symmetrically shaped. Similarly the spaces between the teeth at the bottoms of the dales are wider than any of the other spaces D and are symmetrical. The tooth spacing gradually decreases from the maximum spacing at the bottoms of the dales to the minimum spacing at the tops of the hills to correspond to the varying effective radius of the pinions as they run over the side gear faces.

Another very important factor is that the numbers of teeth on the pinions and side gears are so chosen that the gear elements will all be symmetrical and each tooth on the pinions will always mesh with the same teeth on the side gears. For this purpose the pinions must have even numbers of teeth and the side gears must each have a number of teeth equal to the product of the number of pinion teeth and the number of hills or dales on the side gear. In the examples shown, each side gear has two hills and two dales and the pinions have eight teeth so that each side gear will have sixteen teeth. In this way, as the pinions run over the side gears the same pinion teeth will always mesh with the same side gear teeth so that they will fit properly at all times with the effective pinion radius corresponding properly to the side gear tooth spacing at any given time. If it should be desired to use side gears having, for example, three hills and three dales a pinion with an even number of teeth would still be required and each side gear would have three times as many teeth as the pinion.

The pinions are always so assembled that when a tooth on the short radius side of the hub 16 meshes with the space at the top of a hill 15 on one side gear, the tooth directly opposite thereto will mesh in the space at the bottom of a dale on the opposite side gear. This condition is shown in full lines at 13 at the left of Figure 2. As the side gears turn relative to each other the pinions will move over the side gears until eventually the pinion position is reversed as indicated by the dotted position 13' of Figure 2. In the full line position when force is applied to the cage 17 to turn it and move the pinions around with it a longer leverage acts on the side gear 10 than on the side gear 11 so that less torque will be applied to the side gear 10 than to the side gear 11. In the reverse position shown at 13' the exact opposite is true and greater torque is applied to the side gear 10 than to the side gear 11. At an intermediate position shown at 13" the center of the pinion lies in the plane 18 so that the leverages on the side gears are equal and the side gears will be driven with equal torque.

In normal running of a vehicle when both wheels have substantially equal traction, the pinions will normally lie in the equalized position shown at 13" to drive both wheels with the same torque. In the event one wheel for example that connected to the side gear 10, should strike a slippery spot, the side gear 10 will tend to turn faster than the side gear 11. At this time, the pinions will roll between the side gears through the various positions shown and each time they reach the full line position 13 they will transmit to the side gear 11 a torque impulse greater than the torque which the side gear 10 can absorb. If this torque is sufficient to drive the vehicle, it will continue in operation with the pinions in the illustrated full line position through the side gear 11 without further slipping.

Under severe conditions, when the side gear 10 is capable of absorbing little or no torque, the side gears will continue to rotate relative to each other and each time the pinions pass through the illustrated full line position a high torque impulse will be transmitted to the pinion 11. Thus, even though one of the wheels absorbs little if any torque the vehicle will still be driven through the opposite wheel with a minimum of slipping.

With the gears and pinions constructed as illustrated and described herein the pinions will run smoothly on the gears in all relative positions thereof without any binding. Thus, wear will be minimized and the gear set will have an extremely long useful life equal to that of a conventional pivotal gear differential.

It will be understood that any desired number of pinions can be employed, depending upon the type of differential desired and the load to be transmitted thereby. It will furthermore be understood that the axial offset between the hills and dales on the side gear can be made any desired amount depending upon the desired torque differential. Therefore, while one embodiment of the invention has been shown and described in detail, it is not to be taken as a definition of the scope of the invention, reference being had for this purpose to the appended claims.

What is claimed is:

1. A differential gear set comprising a pair of side gears mounted for rotation on a common axis and having their toothed faces in spaced relationship, the toothed faces of the side gears being sinuously curved to provide a hill and dale formation, the teeth at the bottoms of the dales being relatively widely spaced and the tooth spacing gradually decreasing to a minimum at the tops of the hills, a circular pinion mounted between the side gears and having uniformly spaced teeth meshing with the teeth on the side gears, and means mounting the pinion for rotation about an axis eccentric to the center of the pinion and transverse to the axis of the side gears.

2. A differential gear set comprising a pair of side gears mounted for rotation on a common axis and having their toothed faces in spaced relationship, the toothed faces of the side gears being sinuously curved to provide a hill and dale formation, the teeth at the bottoms of the dales being relatively widely spaced and the tooth spacing gradually decreasing to a minimum at the tops of the hills, the teeth between the bottoms of the dales and the tops of the hills having their opposite sides of different depths with the sides of greater depth facing the dales.

3. A differential gear set comprising a pair of side gears mounted for rotation on a common axis and having their toothed faces in spaced relationship, the toothed faces of the side gears being sinuously curved to provide a hill and dale formation, the teeth at the bottoms of the dales being relatively widely spaced and the tooth spacing gradually decreasing to a minimum at the tops of the hills, a circular pinion mounted between the side gears and having uniformly spaced teeth meshing with the teeth on the side gears, and means mounting the pinion for rotation about an axis eccentric to the center of the pinion and transverse to the axis of the side gears, the teeth on the pinion being of substantially standard involute shape but with their tips rounded.

4. A differential gear set comprising a pair of side gears mounted for rotation on a common axis and having their toothed faces in spaced relationship, the toothed faces of the side gears being sinuously curved to provide a hill and dale formation, the teeth at the bottoms of the dales being relatively widely spaced and the tooth spacing gradually decreasing to a minimum at the tops of the hills, a circular pinion mounted between the side gears and having uniformly spaced teeth meshing with the teeth on the side gears, and means mounting the pinion for rotation about an axis eccentric to the center of the pinion and transverse to the axis of the side gears, the pinion having an even number of teeth thereon and each of the side gears having a number of teeth thereon equal to the product of the number of pinion teeth and the number of hills or dales on each side gear.

5. A differential gear set comprising a pair of side gears mounted for rotation on a common axis and having their toothed faces in spaced relationship, the toothed faces of the side gears being sinuously curved to provide a hill and dale formation, the teeth at the bottoms of the dales being relatively widely spaced and the tooth spacing gradually decreasing to a minimum at the tops of the hills, a circular pinion mounted between the side gears and having uniformly spaced teeth meshing with the teeth on the side gears, and means mounting the pinion for rotation about an axis eccentric to the center of the pinion and transverse to the axis of the side gears, the pinion having an even number of teeth thereon and each of the side gears having two hills and two dales thereon and having twice the number of teeth thereon as are on the pinion.

6. A differential gear set comprising a pair of side gears mounted for rotation on a common axis and having their toothed faces in spaced relationship, the toothed faces of the side gears being sinuously curved to provide a hill and dale formation, a circular toothed pinion mounted between and meshing with the side gears, and means mounting the pinion for rotation on an axis eccentric to its center and transverse to the axis of the side gears, the teeth on the pinion and the side gears being unevenly spaced with respect to each other and with those teeth which are active when the pinion teeth farthest from the pinion axis mesh with the teeth on one of the side gears being most widely spaced.

7. A differential gear set comprising a pair of side gears mounted for rotation on a common axis and having their toothed faces in spaced relationship, the toothed faces of the side gears being sinuously curved to provide a hill and dale formation, a circular toothed pinion mounted between and meshing with the side gears, and means mounting the pinion for rotation on an axis eccentric to its center and transverse to the axis of the side gears, the pinion having an even number of teeth thereon and each side gear having a number of teeth equal to the product of the number of pinion teeth and the number of hills or dales on the side gear.

8. A differential gear set comprising a pair of bevel side gears mounted for rotation on a common axis with their beveled toothed faces in spaced facing relationship, the toothed faces of the side gears being sinuously curved to provide a hill and dale formation, a pair of bevel pinions mounted on a common axis transverse to the axis of the side gears and meshing with the side gears, a gear casing extending around the side gears and the pinions, a hub on each of the pinions eccentric to its center and extending outward from the pinion and journaled in the gear casing, and a guide shaft for the pinions journaled at its ends in the smaller ends of the pinions and of smaller diameter than the smaller ends of the pinions, the guide shaft being coaxial with the pinion hubs the pinions having even numbers of equally spaced teeth thereon, and each side gear having twice as many teeth as each pinion and having its teeth relatively widely spaced at the bottoms of the dales with the tooth spacing gradually decreasing to a minimum at the tops of the hills.

References Cited in the file of this patent

UNITED STATES PATENTS

| Number | Name | Date |
|---|---|---|
| 1,888,656 | Boynton | Nov. 22, 1932 |
| 1,948,095 | Boynton | Feb. 20, 1934 |
| 2,009,915 | Davis | July 30, 1935 |
| 2,065,661 | Davis | Dec. 29, 1936 |
| 2,067,952 | Scurlock | Jan. 19, 1937 |
| 2,392,441 | Wildhaber | Jan. 8, 1946 |
| 2,490,146 | Miller, Jr. | Dec. 6, 1949 |